Figures 1, 2, 4, 7:
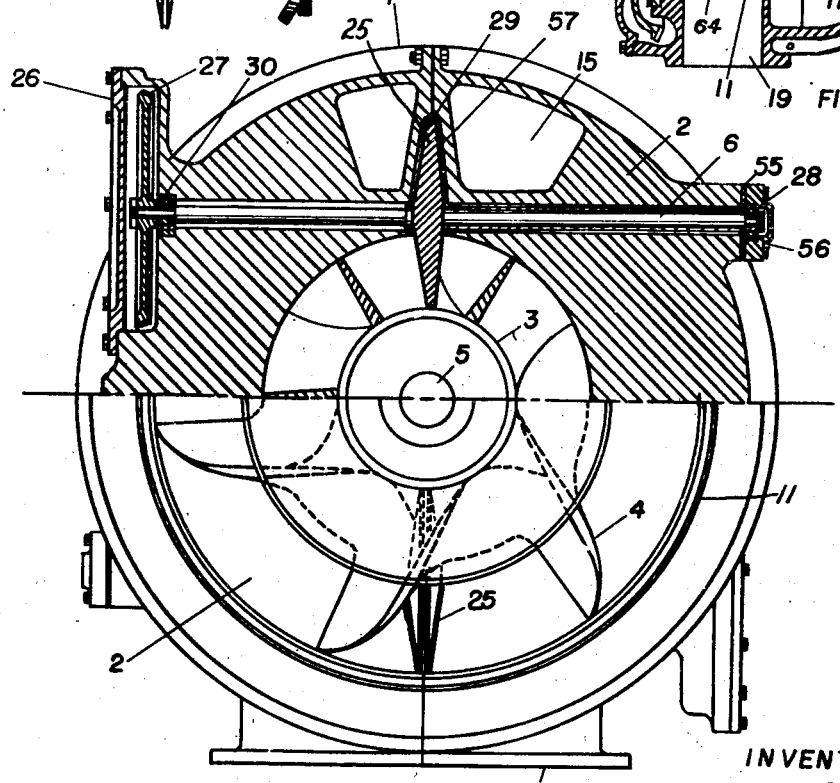

Nov. 26, 1946.  A. E. BIERMANN  2,411,707
COMPRESSOR
Filed Dec. 24, 1941    2 Sheets-Sheet 1

INVENTOR
Arnold E. Biermann

Nov. 26, 1946.  A. E. BIERMANN  2,411,707
COMPRESSOR
Filed Dec. 24, 1941  2 Sheets-Sheet 2

INVENTOR
Arnold E. Biermann

Patented Nov. 26, 1946

2,411,707

UNITED STATES PATENT OFFICE 2,411,707

COMPRESSOR

Arnold E. Biermann, Hampton, Va.

Application December 24, 1941, Serial No. 424,335

19 Claims. (Cl. 230—150)

This invention relates to improvements in gas compressors or power producing engines of the rotary type. The main object of the invention is to provide an engine or compressor of compact and practical construction combined with efficient operation.

Although an exceedingly large number of rotary engines of the positive displacement type have been invented, a study of practically all of them will show a failure to meet one or more of several basic requirements to present a sufficiently well balanced combination of features to compete with present day reciprocating engines. From a theoretical standpoint, the efficiency of the rotary engine can be considerably better than that of the turbine. Likewise, the rotary engine can be smaller than the reciprocating engine for a given capacity. In practice, the rotary engine has never attained its full possibilities and has not been able to compete with the turbine and the reciprocating engine except in small sizes where first cost is an important consideration. In the following, it is desired to present the basic requirements that will make the rotary engine an improvement over existing engines of the same purpose and to show that these requirements are met by my invention.

In order to have any appreciable advantage over the steam turbine or the turbo-compressor, the rotary engine must have an almost similar volume capacity for a given size of machine. This capacity can be obtained by achieving a large displacement per revolution or can be obtained by high speed operation, or both. It will be shown that both of these possibilities are present in my invention.

It is the ability of the steam turbine to handle the tremendous volumes of steam which result when steam is expanded to high vacuum that makes it more efficient in large sizes than the reciprocating engine. This is because the efficiency of the steam engine depends upon the ratio of the inlet to outlet pressure and this ratio can be much greater for the turbine than for the reciprocating engine because of its large volume capacity. Rotary engines disclosed in Peigler, U. S. No. 1,037,655, and Maxam, U. S. Patent No. 1,304,497 and Good U. S. Patent No. 1,989,552, are inherently of such design as to displace less than half of the volume of the outside housing dimensions per revolution. In order to compete with steam turbines, the volume capacity should be as much as three times the volume capacity of any of the foregoing inventions.

As the rotary engines of the foregoing classification have many leakage areas which are impractical to seal with packing of any description owing to the friction and wear of such sealing devices, it is necessary that these clearance or leakage areas be kept small because the leakage is a direct charge against the efficiency and capacity of the machine. For any given machine this leakage or slip loss is a fixed amount depending on the pressure difference across the leakage slots, but is practically independent of the speed of the machine. It is therefore obvious that unless the rotary engine can handle a sufficiently large quantity of gas per unit time, the leakage losses will be a large percentage of the total capacity, and the efficiency will be low. The devices of Peigler, Maxam, and Good all have insufficient volume capacity per unit leakage area to make them at all efficient in handling gases.

From the foregoing it is readily seen that the volume capacity for a given size is extremely important in rotary engines and that any increases in the volume capacity of such devices may account for the difference between success and failure. In my invention the volume capacity per revolution can be several times the cubical contents of the outside dimensions. The capacity is so great that even with large clearance areas and at fairly low speeds the leakage volume is only a small percentage of the capacity.

The large volumes which must be handled by the successful rotary engine necessitate very large port and passage areas if the charging and friction losses are to be kept at reasonable values. The available port area in the device of the Peigler Patent No. 1,037,655 is inherently too small to keep these losses from being excessive. In my present invention the ports and passages are inherently larger than in other devices of this character.

In reciprocating steam engines a considerable heat loss is incurred by exhausting the cold steam back over the hot end of the cylinder, thus causing the cylinder to be chilled. This difficulty has been remedied by the invention of the "uniflow" engine in which the steam never reverses its path. This feature is important to efficiency and is provided in my invention. This feature also makes for more efficient air compressors in that if the incoming air enters through the cold end of the cylinder instead of the hot compression end, as is done normally, less heat is absorbed from the cylinder walls. Furthermore, the single direction of air moving at high speed through rotary compressors of this type should incur but few shock losses as compared with the reciprocating compressor which must move each charge in and out of the cylinder during each cycle.

The gyroscopic and centrifugal forces incident upon the rotary abutment shafts of the devices of Peigler, Maxam, and of my previous invention, U. S. Patent No. 2,090,280, are very excessive even at moderate speeds making these constructions impractical. This difficulty has been eliminated in my present invention.

In the afore-mentioned devices, investigation will show an inherent lack of means for absorbing the thrust forces incident on the abutment shaft due to the pressure difference across the abutment. In modern practice this thrust must be taken either by a pressure lubricated thrust bearing or an anti-friction thrust bearing. Either of these are too large to mount in the space available in these devices. This difficulty is obviated in the present invention by projecting the abutment shafts to the outside of the housing and providing a thrust bearing at that point. This construction is not possible with the devices of Peigler and Maxam, or with my previous invention.

In rotary engines the elimination of rubbing surfaces moving at high speeds is very important unless extremely good lubrication is provided. The provision of the latter is impractical in the case of impellers sliding along spiral vanes at high speed as is done in the devices of Peigler and Maxam. The only practical construction in any of these devices for driving the rotary abutment is by gearing unless some other means are provided for preventing sliding contact. A practical means of gearing the aforementioned devices is not seen. In my present invention, gearing can be done in a practical manner with only one pair of gears in the train to prevent back lash. If gearing is resorted to for driving the abutments, it is obvious that very accurate synchronization must be obtained or unwanted rubbing of parts will result. This requirement stipulates that the backlash and flexibility in the drive must be a minimum. For a practical drive only one back lash (one pair of gears) should be allowed. In the case of very accurate, fine-pitch gears two back lashes may be allowed. In this respect the gear train shown in the referred-to Good patent is highly undesirable. In my present invention the abutment is synchronized with the rotor by means of one pair of large diameter gears. The diameter of the gears is equally as important as the amount of back lash. In Peigler's design it would be impossible to employ large diameter gears for synchronizing the rotary abutment.

Figure 3:
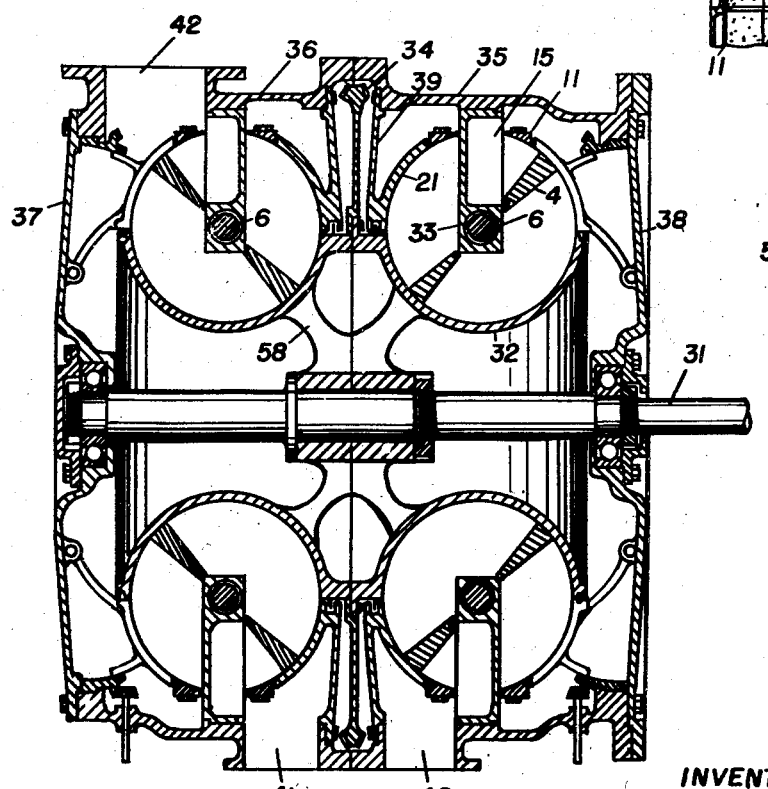

In the construction of my previous invention, the shape of the slots in the rotary abutments is such as to practically cut away the thickness of the spiral vanes on the inner diameter of the torus during the generating process. This same effect is shown in Figure 3 of Peigler. This difficulty has been eliminated in the present invention by placing the edges of the abutment slots in a very definite relationship with respect to each other, and with respect to the abutment.

In the devices of Peigler and Maxam, and in my previous invention the total thrust force incident on the rotor shaft as caused by the unbalanced gas pressures on either side of the rotor may be excessive and may be sufficient to cause the structural members to deflect unless very strongly built. This applies particularly to engines of large size. In my invention this difficulty is obviated by placing two rotors in parallel so that the side forces of one offset the side forces of the other.

My invention is particularly adapted to aircraft engine supercharging where the requirements as to efficiency, capacity and pressure ratio are very severe. In this field the centrifugal compressor has been used predominantly, although the axial flow and Roots blowers have been considered for this service. In tests the Roots blower has reached higher values of overall adiabatic efficiency than either the axial flow or the centrifugal types. This has been true although the Roots type is a displacement blower (hydraulic type of indicator card). My invention has all of the attributes of the Roots blower with the additional advantages of greater capacity and a polytropic cycle of compression. The basic improvement in efficiency of my blower over the Roots as caused by the difference between a square indicator card and a polytropic type of indicator card should provide a substantial increase in adiabatic efficiency over that of either of the other supercharger types. The lower slip losses of my invention should increase this value still further. The efficiency of superchargers is particularly important on account of the detrimental effect of high intake air temperatures on engine power.

The lack of a satisfactory method of controlling the capacity and pressure ratio of the centrifugal and axial flow blowers at sea level and at intermediate altitudes, where the blower capacity is greater than the engine can use, causes a considerable power loss owing to the excessive temperature rise of the air as caused by operating at the pressure ratio corresponding to the maximum altitude condition of operation for which the blower is constructed. This difficulty of centrifugal blowers has necessitated the use of variable gear ratios in the drive between the supercharger and the engine, and in some cases it has been found worthwhile to drive the supercharger by means of an exhaust turbine in order to obtain a flexible speed control. The capacity of my compressor can be readily controlled to suit the demand of the engine without loss of power or without resorting to changes in speed.

In supercharging aircraft engines, the altitude attainable is dependent upon the ratio of the outlet pressure to the inlet pressure of the supercharger. To maintain sea level engine power at an altitude of 18,000 feet requires a pressure ratio of approximately two to one. It has not been possible to obtain a much greater ratio than this with a single stage centrifugal compressor thus making it necessary to resort to several stages if high altitudes are to be attained. In my invention the pressure ratio in a single stage is only limited by the slip losses which should not be serious at a 40,000 foot altitude. Here it is obvious that the maximum practical compression ratio obtainable with rotary compressors is a function of the volume capacity for a given size because the detrimental effects of the slip losses at high pressure ratios are a function of the volume capacities of the compressors.

From the foregoing it is obviously true that the basic failure of rotary engines in general is caused by lack of volume capacity for a given size of machine. If this fault can be obviated by a new combination of old mechanisms or by the perfection in degree of old mechanisms it should be considered as invention inasmuch as it has not been done and is therefore apparently not obvious, and if done it may be put to an extremely useful purpose.

Figure 6:
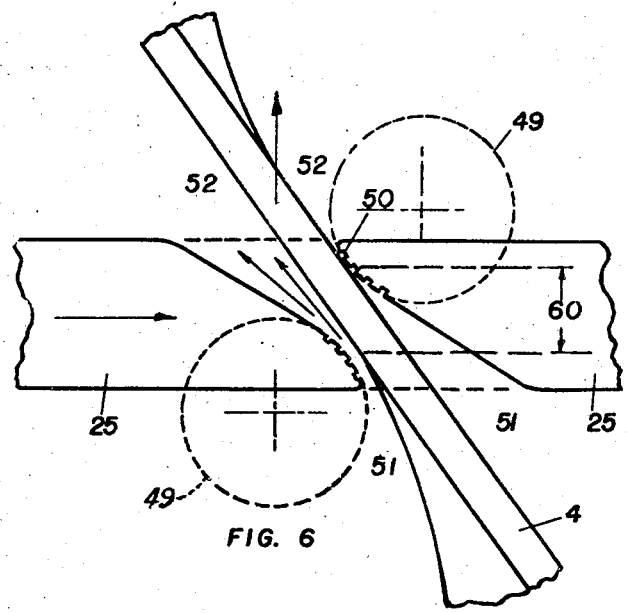
Figure 8:
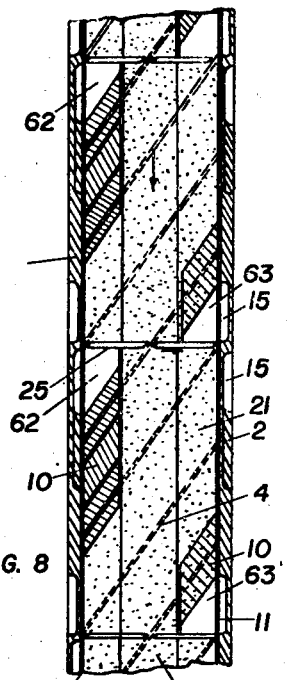
Figure 5:
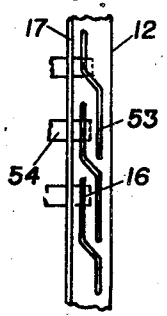

In the accompanying drawings Figure 1 is a transverse vertical cross section view of a device as constructed in accordance with the principles of my invention; Figure 2 is an end view of which the top half is a longitudinal cross section through the center of Figure 1 and the lower half is a side view in elevation with a portion of the side housing removed; Figure 3 is a double unit shown in section; Figure 4 is a schematic drawing of one form of geared drive; Figure 5 is a schematic plan view of a portion of a cam for opening port gates; Figure 6 is a schematic plan view showing the intersection of a spiral vane and a rotary abutment; Figure 7 is a schematic view showing a method of generating the spiral vanes; Figure 8 is a schematic diagram showing the cycle of operation. This figure indicates the major elements and their relative movements. Diagrammatically, it represents the surface of a section of the toroidal housing laid out flat.

Referring to Figure 1, 1 designates an outside housing of which 2 is a fixed abutment constructed as part of the housing. Rotor 3, on which spiral vanes 4 are mounted, is carried by shaft 5 in bearings mounted in the side housings 7 and 8. In Figures 1, 2, and 3 the shafts 6 carry the slotted rotary abutments 25. Referring to Figure 1, the housing cover 9 forms an oil tight chamber for the gear 14. In this figure the gates 10 serve to vary the size of the port openings. These gates are pivoted about pins 18. The hoops 11 of Figures 1, 2, 3, and 8 serve to support the free ends of the spiral vanes 4 which start at one face of the fixed abutment 2 and spiral around the torus to the opposite side of 2. Referring to Figures 1, 3, and 5, the cam 12 which is constructed integrally with the gear 17 is driven by the pinion 13 for adjustment of the opening of the gates 10. The pins 16 engage with the cam 12 and the slots 53 as shown in Figures 1 and 5. The recesses 15 which are formed in the fixed abutment 2 as shown in Figures 1, 2, 3, and 8 serve as additional port areas as indicated in Figure 8. In Figure 8 the same fixed abutment 2 is shown on both sides of the diagram to indicate the position of the ports relative to the recesses. In Figure 1 the ports 19 and 20 are for inlet or discharge of the fluid. The fixed portion of the toroidal housing 21 is carried by the side member 8. The flanged surfaces 22 are provided for mounting purposes. The slots 23 and 24 serve as labyrinths for diminishing leakage losses.

Referring to Figure 2, 25 is a slotted rotary abutment which is mounted on shaft 6 to rotate in bearings 28 and 30. The gear 27 is mounted on shaft 6 to engage gear 14 of Figure 1 so that rotation of shaft 5 will rotate the rotary abutments 25 at a predetermined speed ratio. The cover plate 26 is provided for making the gear compartment oil tight. A slot 57 is provided in the fixed abutment 2 for receiving the rotary abutments 25. Although not indicated on the drawings this slot 57 has provided on the surfaces adjacent to the rotary abutments, labyrinth slots extending parallel to the abutment for reducing leakage through this clearance area. The slots 29 are placed in the periphery of the rotary abutment 25 for the same purpose. Likewise, slots 64 are placed in the periphery of spiral vanes 4 as shown in Figure 1 for reducing leakage between the spiral vane and the fixed portion of the toroidal chamber. A spacer 55, of the required thickness, is inserted between housing 1 and the bearing cap 56 for providing axial adjustment of the position of the rotary abutment 25.

Referring to Figure 3, 31 is the rotor shaft upon which is mounted the double rotor 32. In the construction shown the toroidal rotor surfaces are supported on the radial spokes 58 to provide an axial extending passage-way for the flow of fluids. In the construction of the device shown in Figure 3, the fixed abutments 33 are removable. The gear 34 is fastened to rotor 32 and is arranged for driving the gears 27 as shown in Figure 2. The housing comprises parts 35 and 36 with the end housings 37 and 38. The inner housing members 39 support the fixed walls 21 of the toroidal chambers. The ports 40, 41, and 42 serve for the passage of fluids to and from the housing.

An alternate gearing arrangement is shown in Figure 4. Here the gear 46 is mounted on the rotor shaft 5 and engages with gears 45 which are mounted with gears 44 on shafts 47. Gears 44 engage with gears 43 which are mounted to turn rotary abutment shafts 59 and rotary abutments 25.

In Figure 7 is shown one method for generating the spiral vanes 4 from the movement of the two surfaces of revolution 48. The surfaces of revolution 48 correspond to the generating circles 49 of Figure 6. The one spiral vane of Figure 7 corresponds to the one spiral vane 4 on one side of the fixed abutment 2 of Figure 1 and the other spiral vane 4 of Figure 7 corresponds to the spiral vane on the opposite side of fixed abutment 2 in Figure 1. The edges of the slot in rotary abutment 25, shown in Figure 6, simulate portions of the surfaces of revolution 48. It can be seen from the foregoing description that the spiral vanes 4 can be generated by revolving the surfaces of revolution 48 in the toroidal chamber in a plane substantially parallel to the axis of the rotor and simultaneously revolving the surfaces of revolution 48 around the axis of the rotor 3. In this manner the tools for constructing the spiral vanes can be milling cutters and the surfaces can be finished by rotary grinding wheels of the same shape. An inclination of the axes of the generating surfaces is provided in order to prevent too great a change in vane thickness in passing from the outer diameter of the torus to the inner diameter. In addition a tilting of the axes of 48 provides spiral vanes of wedge section even when using a cylindrical milling cutter. The provision of the tilted axes is very important in the practical construction of the spiral vanes.

Figure 6 shows how rotation of the rotary abutments 25 can be effected from the forces of the fluid pressures alone. Circles 49 are the generating circles for the spiral vanes and also form the edges of the slots of the rotary abutments 25. Labyrinth slots 50 are provided for reducing the gas leakage through these areas. The region 51 is at a high fluid pressure relative to the region 52 which is the downstream side. The distance between the closest points of contact on each side of the slot in the abutment is represented by 60 which is the width of the area affected by the difference in pressure. The force that is created by the difference in pressure can be sufficient to turn the rotary abutment against the bearing friction. Additional forces are available for moving the rotary abutments 25 relative to the spiral vanes 4 without rubbing contact. This is apparent from a study of the diagram of Figure 6 as follows: The leakage flow from 51 to 52 creates a low pressure area at the narrow Venturi passage. This pressure forces the rotary abutment 25 closer to the spiral vane 4 and at the same time opens a leakage area on the opposite side of the vane with the creation of a similar force which tends to balance the original force. The forces thus created are stable and tend to prevent rubbing contact between the rotary abutments and spiral vanes.

The diagram of Figure 5 shows how the port gates 10 of Figure 1 to which are fastened the arms 54 are opened or closed consecutively by movement of the cam 12.

The operation of my device and the functions of the various ports is best understood by the diagram of Figure 8. The toroidal chamber is represented as bounded by the moving rotor surface 3 which is shown by the stippled band in the center of the diagram to which the spiral vanes 4 are attached. The ports on either side of the rotor surface are stationary, the open portion being shown as a clear area and the cross-hatched portions representing port areas which are covered by movable gates. The fixed abutment 2 is shown on both sides with the recesses 15. The restraining hoops 11 move with the rotor and spiral vanes. A study of Figure 1 will show that these hoops 11 do not block the passage between the toroidal chambers 61 and the recesses 15 as indicated in Figure 8. In Figure 8 the intake ports 62 and the discharge ports 63 are shown partly covered by gates 10.

In operation as a compressor the parts move in the direction of the arrows, fluid is inducted through the ports 62 into each compartment formed by the walls of the toroidal chamber, the fixed abutment, the spiral vanes and the rotary abutment. After the compartment is filled to the desired capacity, the ports close and compression of the charge is effected until the desired pressure is reached at which time the discharge ports open. It is apparent that control of the capacity is effected as the opening length affects the time of cut-off. With this method of control little power is lost. Control of the pressure ratio is likewise obtained by the length of the discharge ports as is evident from Figure 8.

A study of a diagram similar to that of Figure 6 but which shows the rotary abutment 25 passing through the fixed abutment will reveal that in order to prevent leakage through the fixed abutment slots when the slots of the rotary abutments pass through, that the maximum overall projected width of the rotary abutment slots in a plane parallel to the plane of rotary motion of the rotary abutments must be equal to or less than the thickness of the fixed abutment.

Although the construction of my invention as set forth has certain advantages, it is to be understood that I do not wish to confine my invention to any specific combination as shown.

What I claim is:

1. In a device of the class described, the combination of a housing having a torus-like recess, a rotor mounted for rotation in said housing in close association with respect to said recess to form a toroidal chamber, a fixed abutment supported by said housing and extending into said toroidal chamber, spiral vanes supported by said rotor to move in close association with respect to said torus-like recess and said fixed abutment, rotatable abutments adapted to move in close association with respect to said toroidal chamber, said spiral vanes and said fixed abutment to form compartments adapted to vary in volume as the rotor is rotated, intake and discharge ports for communication with said toroidal chamber.

2. In a device of the class described, the combination of a housing having a torus-like recess, a rotor mounted for rotation in said housing in close association with respect to said recess to form a toroidal chamber, a fixed abutment supported by said housing to extend into said toroidal chamber, rotary abutments carried by shafts rotatably supported in bearings mounted outside the largest circumference of said toroidal chamber, spiral vanes supported by said rotor to move in close association with respect to said torus-like recess, said fixed abutment and said rotary abutments to form compartments adapted to vary in volume as the rotor is rotated, intake and discharge ports for communication with said toroidal chamber.

3. The combination of a housing having a torus-like recess, a rotor mounted for rotation in said housing in close association with respect to said recess to form a toroidal chamber, a fixed abutment supported by said housing and extending into said toroidal chamber, rotary abutments carried by shafts mounted in said fixed abutment, spiral vanes carried by said rotor to move in close association with respect to said torus-like recess, and said fixed abutment and said rotary abutments to form compartments adapted to vary in volume as the rotor is rotated, intake and discharge ports on opposite sides of said fixed abutment for communication with said toroidal chamber.

4. The combination of a housing having a torus-like recess, a rotor mounted for rotation in said housing in close association with respect to said recess to form a toroidal chamber, a fixed abutment supported by said housing and extending into said toroidal chamber, rotary abutments carried by shafts extending through said fixed abutment to outside the largest diameter of said toroidal chamber, spiral vanes carried by said rotor as to move in close association with respect to said torus-like recess and said fixed abutment and said rotary abutments to form compartments adapted to vary in volume as the rotor is rotated, said housing having intake and discharge ports communicating with said toroidal chamber.

5. A device as claimed in claim 4 wherein means are provided for adjustably varying the length of that part of the cycle in which the intake ports are in communication with the toroidal chamber.

6. A device as claimed in claim 4 wherein means are provided for adjustably varying the length of that part of the cycle in which the discharge ports are in communication with the toroidal chamber.

7. A device as claimed in claim 4 wherein means are provided for rotating said rotary abutments by the pressures and forces exerted by the fluid in said toroidal chamber.

8. A device as claimed in claim 4 wherein means are provided for inducting and discharging a volume of fluid substantially equal to the volume of said toroidal chamber for each said rotary abutment employed and for each revolution of said rotor.

9. A device as claimed in claim 4 wherein means are provided for rotating said rotary abutments at a fixed ratio of speeds with respect to said rotor and independently of contact with said spiral vanes.

10. The combination of a housing having a torus-like recess, a rotor mounted for rotation in said housing in close association with respect to said recess to form a toroidal chamber, a fixed abutment supported by said housing and extending into said toroidal chamber, rotary abutments carried by shafts extending through said fixed abutment to outside the largest diameter of said toroidal chamber, spiral vanes so carried by said rotor as to move in close association with respect to said torus-like recess and said fixed abutment and said rotary abutments to form compartments adapted to vary in volume as the rotor is rotated, said housing having intake and discharge ports communicating with said toroidal chamber, adjustable gates covering said ports for varying the length of that part of the cycle in which the ports are in communication with said toroidal chamber.

11. A device as claimed in claim 10 wherein means are provided for adjustably opening or closing said gates in sequence.

12. The combination of a housing having a torus-like recess, a rotor mounted for rotation in said housing in close association with said recess to form a toroidal chamber, a fixed abutment supported by said housing as to extend into said toroidal chamber, rotary abutments carried by shafts extending through said fixed abutment to outside the largest diameter of said toroidal chamber, spiral vanes carried by said rotor to move in close association with respect to said torus-like recess and said fixed abutment and said rotary abutments to form compartments adapted to vary in volume as the rotor is rotated, said housing having ports on both sides of said fixed abutment communicating with said toroidal chamber, one said port being on one side and another said port being on the opposite side of each rotary abutment.

13. In a device of the class described a housing having two parallel torus-like recesses, a rotor mounted for rotation in said housing in close association therewith to form toroidal chambers, fixed abutments supported by said housing to extend into said toroidal chambers, rotary abutments carried by shafts extending through said fixed abutments to outside the largest diameter of said toroidal chambers, spiral vanes carried by said rotor to move in close association with respect to said torus-like recesses and said fixed abutments and said rotary abutments to form compartments adapted to vary in volume as the rotor is rotated, similar ports, either inlet or discharge, on adjacent sides of said fixed abutments, ports for similar purposes on the non-adjacent sides of said fixed abutments, gears mounted on said rotor between said fixed abutments, pinion gears mounted to turn said rotary abutments by association with said rotor gears.

14. The combination of a housing, a rotor mounted in said housing, a fixed abutment supported by said housing, slotted rotary abutments mounted for rotation on said fixed abutment, spiral vanes carried by said rotor in engagement with said fixed abutment and said slotted rotary abutments to form compartments adapted to vary in volume as said rotor is rotated, intake and discharge ports in said fixed abutment for communication with said compartments, the edges of the slots of said slotted rotary abutments being portions of cylinders of revolution.

15. The combination of a housing, a rotor mounted in said housing, a fixed abutment supported by said housing, slotted rotary abutments mounted for rotation on said fixed abutment, spiral vanes carried by said rotor in engagement with said fixed abutment and said slotted rotary abutments to form compartments adapted to vary in volume as said rotor is rotated, intake and discharge ports in said fixed abutment for communication with said compartments, said spiral vanes being of such shape as would be generated between two surfaces of revolution when said surfaces of revolution revolve in a plane substantially parallel to the axis of said rotor and simultaneously revolve about the axis of said rotor.

16. The combination of a housing, a rotor mounted for rotation in said housing, a fixed abutment supported by said housing, slotted rotary abutments mounted for rotation on said fixed abutment, spiral vanes carried by said rotor in engagement with said fixed abutment and slotted rotary abutments to form compartments adapted to vary in volume as said rotor is rotated, intake and discharge ports in said fixed abutment for communication with said compartments, said spiral vanes being of such shape as would be generated between two surfaces of revolution when said surfaces of revolution revolve in a plane substantially parallel to the axis of said rotor and simultaneously revolve about the axis of said rotor, the axes of said surfaces of revolution being angularly displaced, one from the other.

17. The combination of a housing, a rotor mounted for rotation in said housing, a fixed abutment supported by said housing, rotary abutments mounted for rotation on said fixed abutment, slots in said rotary abutments, spiral vanes carried by said rotor in engagement with said fixed abutment and said slots of said rotary abutments to form compartments adapted to vary in volume as said rotor is rotated, intake and discharge ports in said fixed abutment for communication with said compartments, said spiral vanes being of such shape as to bear obtuse angles with respect to the plane of rotation of said rotary abutments, two opposed edges of the slots of said rotary abutments being relatively displaced normally to said plane of rotation to form vertices of obtuse angles, respectively, at the entrances and exits of said abutment slots and being closer to said spiral vanes than the abutment slot edges forming the vertices of the acute angles supplementary to said obtuse angles for forming areas which when subjected to differences in fluid pressure cause rotation of said rotary abutments.

18. The combination of a housing, a rotor mounted in said housing, a fixed abutment supported by said housing, slotted rotary abutments mounted for rotation on said fixed abutment, spiral vanes carried by said rotor in engagement with said fixed abutment and said rotary abutments to form compartments adapted to vary in volume as said rotor is rotated, intake and discharge ports in said fixed abutment for communication with said compartments, a gear on said rotor, gears rigidly connected to said rotary abutments engaging with said rotor gear, the axis of rotation of said rotor gear being offset from the axes of rotation of said abutment gears, the planes of rotation of said abutment gears being substantially parallel and offset to the axis of rotation of said rotor shaft.

19. The combination of a housing, a rotor mounted for rotation in said housing, a fixed abutment supported by said housing, rotary abutments mounted for rotation on said fixed abutment, slots in said rotary abutments, spiral vanes carried by said rotor in engagement with said fixed abutment and said slots of said rotary abutments to form compartments adapted to vary in volume as said rotor is rotated, intake and discharge ports in said fixed abutment for communication with said compartments, two opposed edges of said slots of said rotary abutments being portions of cylinders of revolution, said spiral vanes being of such shape as to bear obtuse angles with respect to the plane of rotation of said slotted rotary abutments, the axes of said cylinders of revolution on either side of said slots being relatively displaced in opposite directions normally to the plane of rotation of said rotary abutments so as to make the side surfaces of said cylinders the vertices of the two obtuse angles formed by said spiral vanes, respectively, at the entrance to and exit from said slots of the rotary abutments.

ARNOLD E. BIERMANN.